J. H. MANSFIELD.
TOOL CARRIER FEED.
APPLICATION FILED MAY 14, 1920.
1,376,715.
Patented May 3, 1921.
2 SHEETS—SHEET 2.
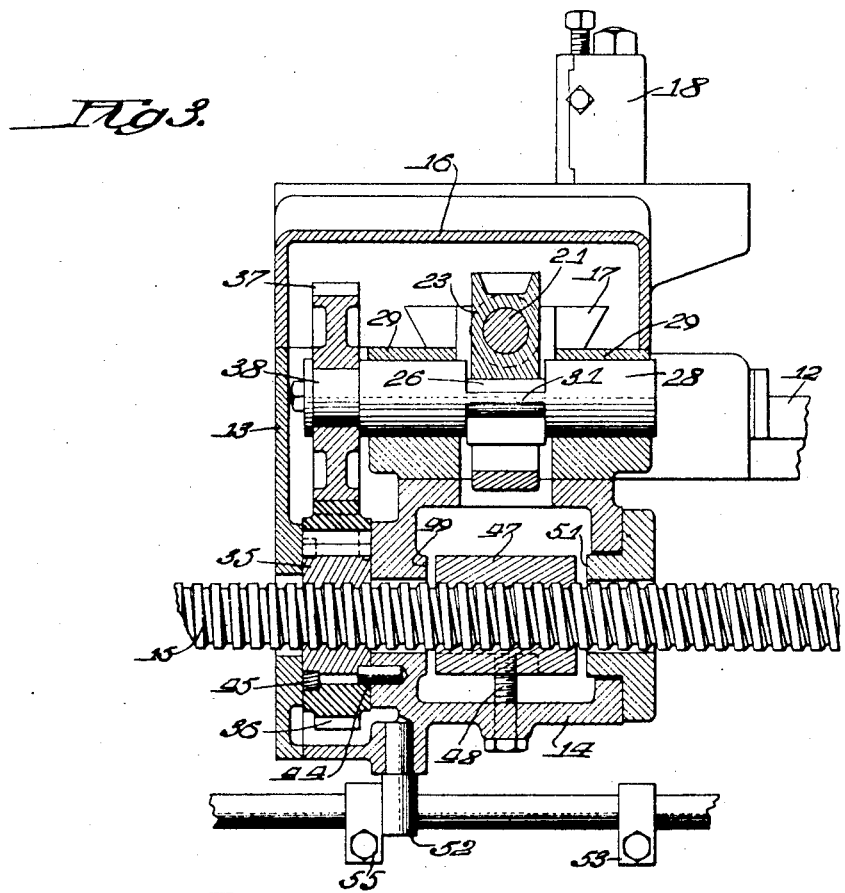
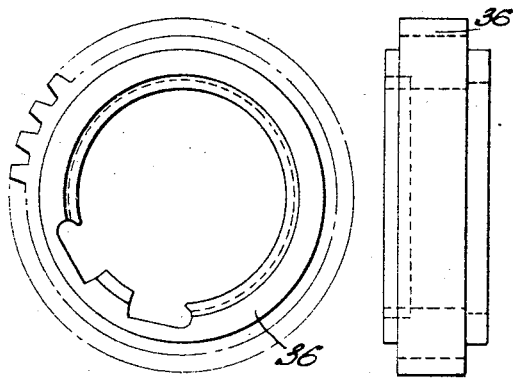
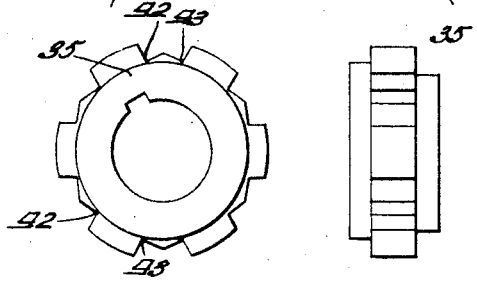

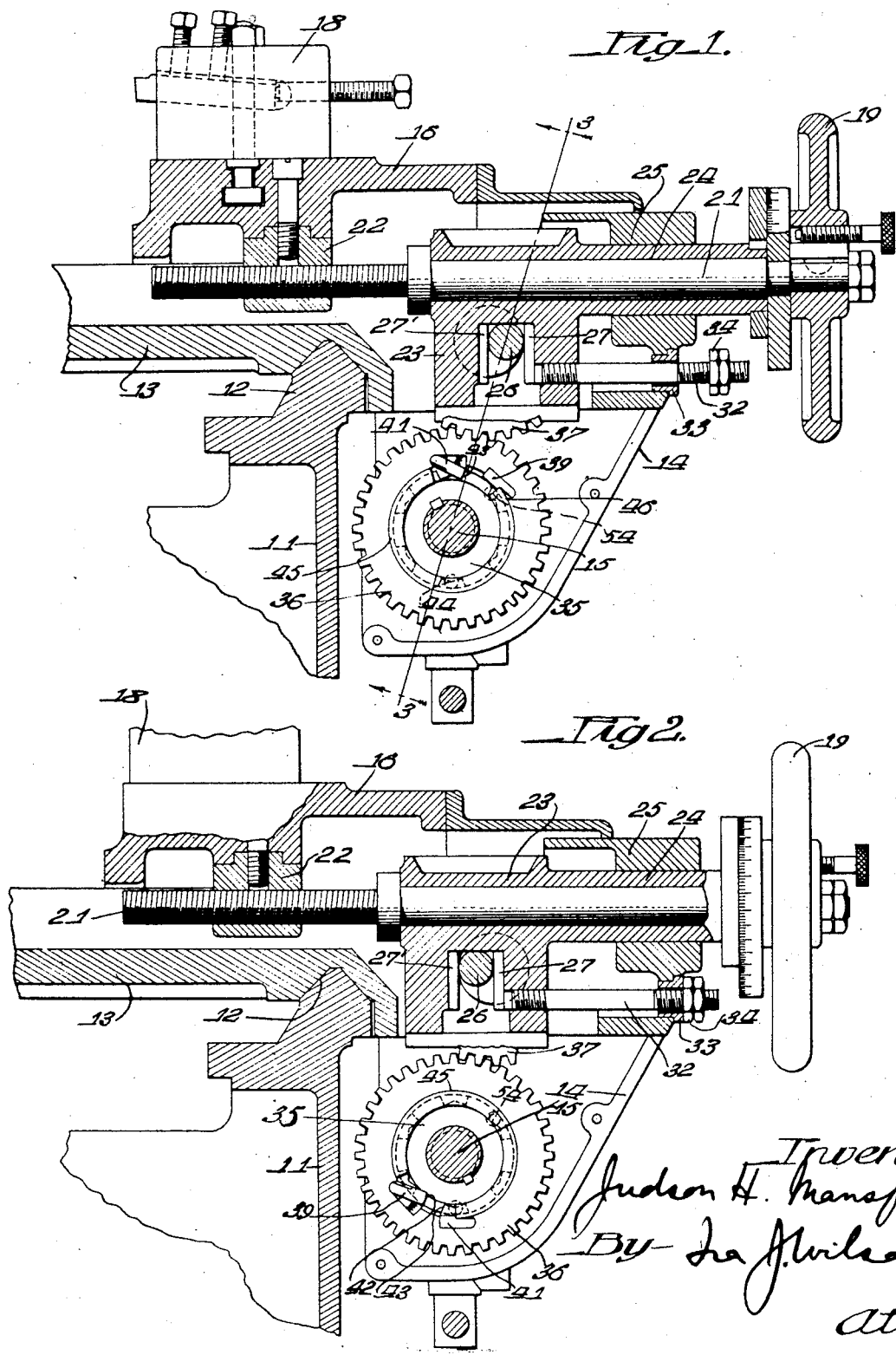

UNITED STATES PATENT OFFICE.

JUDSON H. MANSFIELD, OF ROCKFORD, ILLINOIS, ASSIGNOR TO GREENLEE BROS. & CO., OF ROCKFORD, ILLINOIS, A CORPORATION OF ILLINOIS.

TOOL-CARRIER FEED.

1,376,715.  Specification of Letters Patent.  Patented May 3, 1921.

Application filed May 14, 1920. Serial No. 381,433.

*To all whom it may concern:*

Be it known that I, JUDSON H. MANSFIELD, a citizen of the United States, residing at Rockford, in the county of Winnebago and State of Illinois, have invented certain new and useful Improvements in Tool-Carrier Feeds, of which the following is a specification.

This invention has reference to tool carriage feeds of general application, although especially adapted for use in the art of turning, and more particularly in lathes.

One of the principal objects of the present invention is the provision of novel mechanism for imparting such feed movement to a tool carrier as may be regulated to a high degree of precision, so that duplicate parts may be produced with unvarying accuracy. This desideratum of duplication to within but a neglible percentage of variation, I have obtained by the use of a simple and unique arrangement of feed elements which will be described more fully hereinafter.

Another important object is to transmit by and from the rotary movement of a feed screw, feed movement to a main carriage and an independent feed movement to a tool slide mounted upon the carriage. Applying this principle to a lathe, my invention contemplates feeding a cross tool slide in to depth and then feeding the main carriage lengthwise on the bed, both by rotative movement of the carriage feed screw, or as it is commonly called, the lead screw. Upon reversing the feed screw the cross tool slide will be retracted and then the main carriage returned to starting position.

I have further aimed to provide a tool carriage feed mechanism of the character described comprising but relatively few working parts so designed and arranged as to function very efficiently under any and all conditions and requirements for which the machine is designed.

Still another object is the provision of a feed mechanism of the character in mind of such simple design as to be capable of economical production.

Other objects and attendant advantages will be appreciated by those familiar with this art as the invention becomes better understood by reference to the following description when considered in connection with the accompanying drawings, in which—

Figure 1 is a vertical sectional view through a tool carriage and feed mechanism therefor, embodying my improvement showing the cross tool slide retracted;

Fig. 2, a similar sectional view showing the tool slide advanced to working position;

Fig. 3, a sectional view taken substantially on the line 3—3 of Fig. 1;

Fig. 4, detail side and edge views of the ratchet gear employed in the feed mechanism;

Fig. 5, side and edge views of the ratchet member employed in said mechanism; and Fig. 6, a perspective view of the eccentric which advances and retracts the cross tool slide.

As mentioned above, I have in illustrating my improvements, taken as an example their application to a lathe, and more particularly a metal working lathe, only such parts thereof being shown in the drawings as are necessary for an understanding of the present invention. Only the part 11 of a bed is shown, upon the longitudinal ways 12 of which is mounted for lengthwise travel, a main carriage designated generally by reference character 13. Fixed to and depending from the carriage at the front of the bed is an apron casing 14 through which passes the feed or lead screw 15. This screw may be revolved in reverse directions by any suitable mechanism, for the purposes presently to be described.

A cross tool slide designated generally by 16 is mounted on suitable ways 17 on the main carriage to travel thereon crosswise of the axis about which the work to be turned revolves, it being understood that the axis of the work is parallel with the ways 12 and the feed screw 15. In the present instance, the cross slide 16 is equipped with a tool holder 18 of conventional design. The tool slide may be fed crosswise of the bed either by hand or power. Cross movement to the slide may be imparted by hand for purposes of adjustment, through means of the hand wheel 19 which is fixed to and revolves a screw shaft 21 threadingly engaged in a nut 22 carried by the cross slide and rotatable but held against axial movement in a yoke bracket 23. This yoke is shiftable in the plane of the ways 17, that is, crosswise of the bed by power driven means, thereby feeding the tool slide 16 crosswise. It will be observed that the sleeve extension 24 of the yoke has a bearing in the main carriage at 25 for properly supporting the parts appurtenant to the screw shaft 21.

The immediate means for shifting or feeding the yoke 23 consists of an eccentric or wrist pin 26 disposed between hardened bearing plates 27 and 27' on the yoke arms, and supported at opposite ends by trunnions 28, carried by bearings 29 fixed to the main carriage. By rotating the eccentric 180 degrees from the positioin shown in Fig. 1, it will feed the cross tool slide in to the full extent of its throw, although the proximity of the cutting tool to the work may be varied by adjustment of the hand wheel 19, which provides in fact, a micrometer adjustment. Attention is now directed to the peculiar arrangement of the eccentric body 26 with respect to the trunnions or supporting members 28, in that the high portion of the eccentric body is coincident with the periphery of the trunnions 28. This is effected by so arranging the eccentric that its high part will be turned down, that is, machined in finishing the trunnions, thereby leaving a high portion 31 of substantial width as distinguished from a single point as would be the case if the periphery of the eccentric 26 were a true circle. It will now be observed that there is secured to the yoke, a rod 32 which passes through an opening in an abutment 33 fixed to the carriage 13, and that this rod is equipped with an adjustable stop 34 adapted by contact against the abutment 33, to limit the inward feed movement of the cross tool slide. As a consequence of the foregoing construction, an exceptionally accurate depth control to within a fraction of a thousandth of an inch is obtained and this fine degree of precision is duplicated in the continuous operation of the machine. In setting up the machine to obtain this accuracy the eccentric is turned to the position shown in Fig. 2 with the cross slide feed in to depth, whereupon the stop 34 is screwed down against the abutment 33 until a metal-to-metal contact is obtained between the plate 27' and surface 31. This excludes even an oil film between these surfaces, and thus the next succeeding operation will be duplicated with absolute accuracy. This accuracy is further effected by reason of the fact that regardless of any slight variation in degree in stopping of the eccentric, the radius of the high point thereof is always the same, due to the relatively broad face of the high spot. It will be noted, however, that it is not essential for the high portion 31 to be coincident with the periphery of the trunnion 28, it being only necessary that the high portion shall be on an arc concentric with the trunnion. It will be further observed that while I have shown the part 26 in the form of an eccentric having what might be called a precision depth limit, the term eccentric as used in the specification and claims is merely relative to the form of cross slide feeding mechanism *per se*, and that my invention contemplates the use of any cam or the equivalent in the driving train for effecting the desired cross feed movements.

My invention now contemplates operation of the eccentric 26 in a predetermined manner by rotation of the feed screw 15. More particularly, I propose to establish such operative connection between the feed screw and said eccentric as to revolve the latter in 180-degree movements independently of movement of the main carriage, whereby to feed the cross tool slide in to a working position, then feed the main carriage lengthwise to traverse the work, then retract the cross tool slide and finally return the main carriage to starting position. This result is obtained in the present instance, by a driving connection between the eccentric and feed screw, including a clutch of novel construction adapted to be engaged upon reversing the direction of drive of the feed screw, and to remain engaged only for a predetermined period of rotation thereof during which to advance or retract the tool slide, as the case may be. In the present instance, this driving connection consists of a ratchet member designated generally by character 35 splined on the feed screw 15 and confined between opposed walls on the main carriage, as shown in Fig. 3, so as to move in an axial direction therewith. A gear 36 revoluble upon the periphery of the ratchet member 35 meshes with a gear 37 fixed to an adjacent end 38 of the eccentric trunnion. The gear 36 carries a pair of pivoted spring-pressed pawls or ratchet driving dogs 39 and 41 adapted to engage respectively in any of the recesses 42 and 43 in the periphery of the ratchet member 35. Referring to Fig. 1, it will be observed that these ratchet driving dogs and the recesses therefor are so relatively arranged that when one of the dogs such as 41, is engaged in its respective recess 43, the other dog 39 will be retracted and so held by the pin 54 mentioned hereinafter. Upon now rotating the feed screw in a counter-clockwise direction, the gear 36 will correspondingly be rotated through the agency of the driving dog 41, thus revolving the gear 37 in a clockwise direction and feeding the cross tool slide in toward the work. When the slide reaches its greatest depth, that is, when the eccentric 26 has been moved 180 degrees, the driving dog 41 will be automatically disengaged by contact against a fixed stop or pin 44, thus stopping the in feed of the tool. The feed screw, however, continues in its rotation for the purpose of feeding the main carriage lengthwise on the bed. During this continued rotation of the feed screw, the pawl 41 which would automatically drop into each ratchet recess and cause a clicking noise, is held in a retracted position by a sectional ring 45 which is frictionally urged in a clockwise direction by the ratchet member so that the end 46 of said ring holds the driving dog 39 in a retracted position. It will be obvious that upon reversing the drive of the ratchet member, the opposite end of the ring 45 will engage the dog 41 and hold it in a retracted position. Attention is now directed to Fig. 3 showing a nut 47 engaged on the feed screw and held against rotation by means of the key member 48. It will be observed that there is a space between the ends of the nut and the adjacent walls 49 and 51 of the main carriage. The purpose of this space is to permit a given rotation of the feed screw, a half revolution in the present instance, for the purpose of either feeding in or retracting the tool before the main carriage is fed lengthwise by the feed screw. In other words, referring back to the operation commencing with the parts shown in Fig. 1, during the first half revolution of the feed screw in a counter-clockwise direction, the cross tool slide will be fed in and stopped by action of the pin 44 withdrawing the dog 41. At this point the nut 47 will have been moved to the right, Fig. 3, against the wall 51, thereby feeding the main carriage lengthwise along the feed screw. When the tappet 52 carried by the main carriage strikes the stop 53, the drive of the feed screw will be reversed through the agency of any suitable reversing mechanism. The initial reverse movement of the feed screw will retract the cross tool slide by reason of the fact that the driving pawl 39 will engage in the first recess 42 and will remain so engaged for a half revolution of the feed screw, whereupon this driving pawl will be disengaged by contact against the stop pin 54 in the manner shown in Fig. 1. That is, during this half revolution of the feed screw in the reverse direction, the nut 47 has been fed to the left until it strikes the surface 49, thereby feeding the main carriage in the reverse direction to a starting position defined by the tappet 52 striking the stop 55 and actuating the mechanism above mentioned which stops rotation of the feed screw.

From the foregoing, it will be manifest that by operation of the feed screw in opposite directions the main carriage and cross tool slide are respectively operated to perform a predetermined cutting operation and are returned to a starting position. That is, upon initial rotation of the feed screw, the cross tool slide will be fed in and stopped very accurately with the cutting tool or tools at the requisite depth, whereupon the main carriage will be moved lengthwise of the bed to feed the tool along the work. At a predetermined point in this longitudinal feed movement, the drive of the feed tool will be reversed, and initial reverse movement of the screw will be employed to retract the cross tool slide. Continued reverse movement of the feed screw will return the main carriage to starting position. Control and operation of the tool holder is thus automatically effected and governed primarily by rotation of the feed screw. The parts employed are exceedingly simple and practical for the purposes in mind, although it should be understood that I do not wish to be limited to the particular construction and arrangement, since my invention contemplates broadly the transmission of certain movements from the feed screw to the tool carrier to effect the desired operations.

It is believed that the foregoing conveys a clear understanding of my invention and of the objects prefaced above, and while I have illustrated and described but a single working embodiment, various changes might be made in the construction and arrangement without departing from the spirit and scope of the invention as expressed in the appended claims, in which—

I claim:

1. The combination with a tool carriage and feed mechanism therefor, of a cross tool slide on the carriage, and means operated by said carriage driving means for feeding said tool slide with respect to the work piece, including a cam for feeding the tool slide to a precision depth limit.

2. The combination with a tool carriage and its feed screw, of a cross tool slide on the carriage, and means operated by rotation of the feed screw in one direction to feed the cross tool slide in to working position and thereupon to feed the carriage lengthwise of the feed screw.

3. The combination with a tool carriage and its feed screw, of a cross tool slide on the carriage, and means operated by rotative movement of the feed screw in one direction for feeding the cross tool slide toward the work-piece and the carriage in a feed movement transverse to that of the cross tool slide.

4. The combination with a tool carriage and its feed screw, of a cross tool slide on the carriage, and means operated by rotative movement of the feed screw in one direction for feeding the cross tool slide toward the work-piece and the carriage in a feed movement transverse to that of the cross tool slide and by rotative movement in the opposite direction to retract the cross tool slide and the carriage.

5. The combination of supporting ways, a carriage mounted upon and movable along said ways, a cross feed tool slide mounted upon the carriage, a feed screw, and means operated by the feed screw during a partial rotation thereof to feed the cross tool slide toward the work-piece and during continued rotation for feeding the carriage lengthwise on said ways.

6. The combination of supporting ways, a carriage mounted upon and movable along said ways, a cross-feed tool slide mounted upon the carriage, a feed screw, and means operated by rotation of the feed screw for feeding the cross tool slide in to a working position, and for feeding the carriage lengthwise on said ways with the cross tool slide in said working position.

7. The combination of supporting ways, a carriage mounted upon and movable along said ways, a cross-feed tool slide mounted upon the carriage, a feed screw, and means including an eccentric actuated by rotation of said feed screw for feeding the cross tool slide toward the work-piece.

8. The combination with a tool carriage and its feed screw, of a cross tool slide on the carriage, a ratchet member in driving connection with the feed screw, a ratchet gear revoluble about the ratchet member, an eccentric member in geared connection with said ratchet gear and adapted for advancing and retracting the cross tool slide, and ratchet driving means operative between the ratchet gear and ratchet member adapted for operatively connecting said member and gear.

9. The combination with a tool carriage and its feed screw, of a cross tool slide on the carriage, a ratchet member in driving connection with the feed screw, a ratchet gear revoluble about the ratchet member, an eccentric member in geared connection with said ratchet gear and adapted for advancing and retracting the cross tool slide, ratchet driving means operative between the ratchet gear and ratchet member adapted for operatively connecting said member and gear, and means for automatically engaging and disengaging said ratchet driving means whereby to control the feed and reverse movements of the cross tool slide.

10. The combination with a tool carriage and its feed screw, of a cross tool slide on the carriage, a ratchet member in driving connection with the feed screw, a ratchet gear revoluble about the ratchet member, an eccentric member in geared connection with said ratchet gear and adapted for advancing and retracting the cross tool slide, ratchet driving means operative between the ratchet gear and ratchet member adapted for operatively connecting said member and gear, and means for automatically disengaging said ratchet driving means when said ratchet member has made a partial revolution whereby to stop movement of said eccentric member and the in-feed of the cross tool slide.

11. The combination with a tool carriage and its feed screw, of a cross tool slide on the carriage, and means operated by rotation of the feed screw for imparting in-feed and reverse movements to the cross tool slide including a rotatable member carrying an eccentric having a high portion of a substantial number of degrees coincident with the periphery of said rotatable member.

12. The combination with a tool carriage and its feed screw, of a cross tool slide on the carriage, an eccentric member supported at opposite ends by trunnions mounted for rotation on the carriage, means operative between said eccentric member and the cross tool slide for imparting feed and reverse movements to the latter by operation of said eccentric member, and a driving connection between one of said trunnions and the feed screw for imparting rotative movement to said trunnion.

13. The combination with a tool carriage and its feed screw, of a cross tool slide on the carriage, an eccentric member mounted on the carriage, means operative between said eccentric member and the cross tool slide for imparting in-feed and reverse movements to the latter by rotation of the former and said means including an adjustment whereby to vary the advance of the cross tool slide, and means operated by the feed screw for imparting such movement to the eccentric member as to effect thereby in-feed and reverse movements of the cross tool slide.

14. The combination with a tool carriage and its feed screw, of a cross tool slide on the carriage, means operated by rotation of the feed screw in one direction to feed the cross tool slide in to working position and thereupon to feed the carriage lengthwise of the feed screw, said screw being adapted to be reversed at a predetermined point in the lengthwise feed of the carriage, and means for causing upon said reverse rotation of the feed screw, reverse movement of the cross tool slide and return of the carriage to a starting position.

15. The combination of a tool slide, and means for feeding the tool slide inwardly to a predetermined depth comprising a revoluble member carrying an eccentric having a high portion of a substantial number of degrees on an arc concentric with said rotatable member.

16. The combination of a tool slide, means for feeding the tool slide inwardly to a predetermined depth comprising a revoluble member carrying an eccentric having a high portion of a substantial number of degrees on an arc concentric with said rotatable member, and means for imparting substantially half revolution movements to said member to thereby obtain the in-feed and reverse movements of said tool slide.

17. The combination of a tool slide, means for feeding the tool slide inwardly to a predetermined depth comprising a revoluble member carrying an eccentric having a high portion of a substantial number of degrees on an arc concentric with said rotatable member, and means for imparting half revolution movements to said member to thereby obtain the in-feed and reverse movements of said tool slide, said means comprising a member adapted to be revolved in opposite directions, and a clutch the driven element of which is in driving connection with said eccentric member and which is driven in partial revolution movements in opposite directions upon rotation of the driving member in opposite directions.

18. The combination with a tool carriage and its feed screw, of a cross tool slide on the carriage, a ratchet member in driving connection with the feed screw, a ratchet gear in juxtaposition to said ratchet member, ratchet driving dogs operative between said gear and ratchet member, a driving connection between said gear and the cross tool slide for imparting in-feed and reverse movements to the slide upon rotative movement of the gear in opposite directions, and means for automatically controlling the operative connection of said ratchet driving dogs and the ratchet member upon rotation of the feed screw in opposite directions to thereby effect said in-feed and reverse movements of the cross tool slide.

19. The combination with a tool carriage and its feed screw, of a cross tool slide on the carriage, means operated by rotative movement of the feed screw in opposite directions to effect in-feed and reverse movements of the cross tool slide, and means operative between the feed screw and the carriage whereby the carriage remains stationary during said in-feed and reverse movements of the cross tool slide but is moved lengthwise by the feed screw in a lengthwise feed after the cross tool slide has been fed in to working position and is moved in a reverse direction after said tool slide has been retracted.

20. The combination with a tool carriage and its feed screw, of a cross tool slide on the carriage, a ratchet member rotatable with the feed screw, a ratchet gear revoluble about said ratchet member and equipped with feed and reverse driving dogs coöperable with said ratchet member, means operative between said gear and the cross tool slide for imparting in-feed and reverse movements to the latter upon rotative movement of said gear in opposite directions, and abutments for respectively causing disengagement of the feed and reverse driving dogs when the tool slide has reached the limit of its in-feed and reverse movements.

21. The combination of a tool holder adapted to be moved toward and from a work-piece in feed and reverse movements, a rotary driving part, and means operative between said driving part and tool holder for causing the latter to be fed toward the work-piece upon rotation of said part in one direction and disconnected from said part at a predetermined point in said feed movement, thereby permitting said part to continue in its rotation, and for retracting said tool holder upon rotation of said part in the reverse direction and for disconnecting the driving part from the tool holder when the latter reaches a predetermined position in its reverse movement, thereby permitting the driving part to continue in its reverse rotation.

22. In a feed mechanism, the combination with a carriage and its feed screw, of a tool slide on the carriage and means operated by rotation of the feed screw for feeding the tool slide, including a clutch adapted to transmit feed and reverse movements, said clutch having a feed-drive dog and a reverse-drive dog, and a friction ring for holding either dog in an inoperative position by frictional contact with one of the clutch elements when the other or dog-carrying element is stopped.

23. In a feed mechanism of the character described, the combination with a driving member, a driven member revoluble thereabout, a forward and a reverse drive dog carried by a member, either dog of which is automatically engageable with the other member according to the direction of rotation of the driving member, means for disengaging the driving dog and so holding it, and a friction ring actuated by frictional contact with the driving member for holding the other dog in an inoperative position.

24. In a feed mechanism of the character described, driving and driven members, one of which carries a feed and a reverse driving dog, either one of which is adapted to automatically engage in driving connection the other member according to the direction of rotation of the driving member, and a friction ring actuated by frictional contact with the driving member for holding either dog in an inoperative position.

25. The combination with a tool carriage and feed mechanism therefor, of a tool slide mounted on the carriage, and mechanism on the carriage operated by said feed mechanism for automatically causing the tool slide to be moved forwardly to a working position prior to feed of the carriage in one direction and for causing the tool slide to be moved in a reverse direction prior to feed of the tool carriage in the opposite direction.

26. In a tool feed mechanism, the combination with a carriage and a tool slide thereon, of mechanism for feeding the carriage with respect to the work, and means operated by said carriage feeding mechanism for feeding the tool slide independently of the carriage movement to a precision depth limit.

27. In a tool feed mechanism the combination with a carriage and a tool slide thereon, of a rotary driving part for moving the carriage with respect to the work, and means operated by rotation of said part for intermittently moving the tool slide upon and with respect to the carriage.

28. A tool carrier feed comprising in combination with a carriage and a tool slide thereon, of a rotary driving member associated with the carriage and adapted by reverse rotation to move the carriage in opposite directions, and mechanism on the carriage operated intermittently by said revolving part for feeding the tool slide to a working depth position and for holding the slide in such position while the carriage is moved and for subsequently retracting the slide.

JUDSON H. MANSFIELD.